Oct. 27, 1959   O. A. WANDEL   2,909,780
MAGAZINE CONSTRUCTION
Filed June 4, 1957
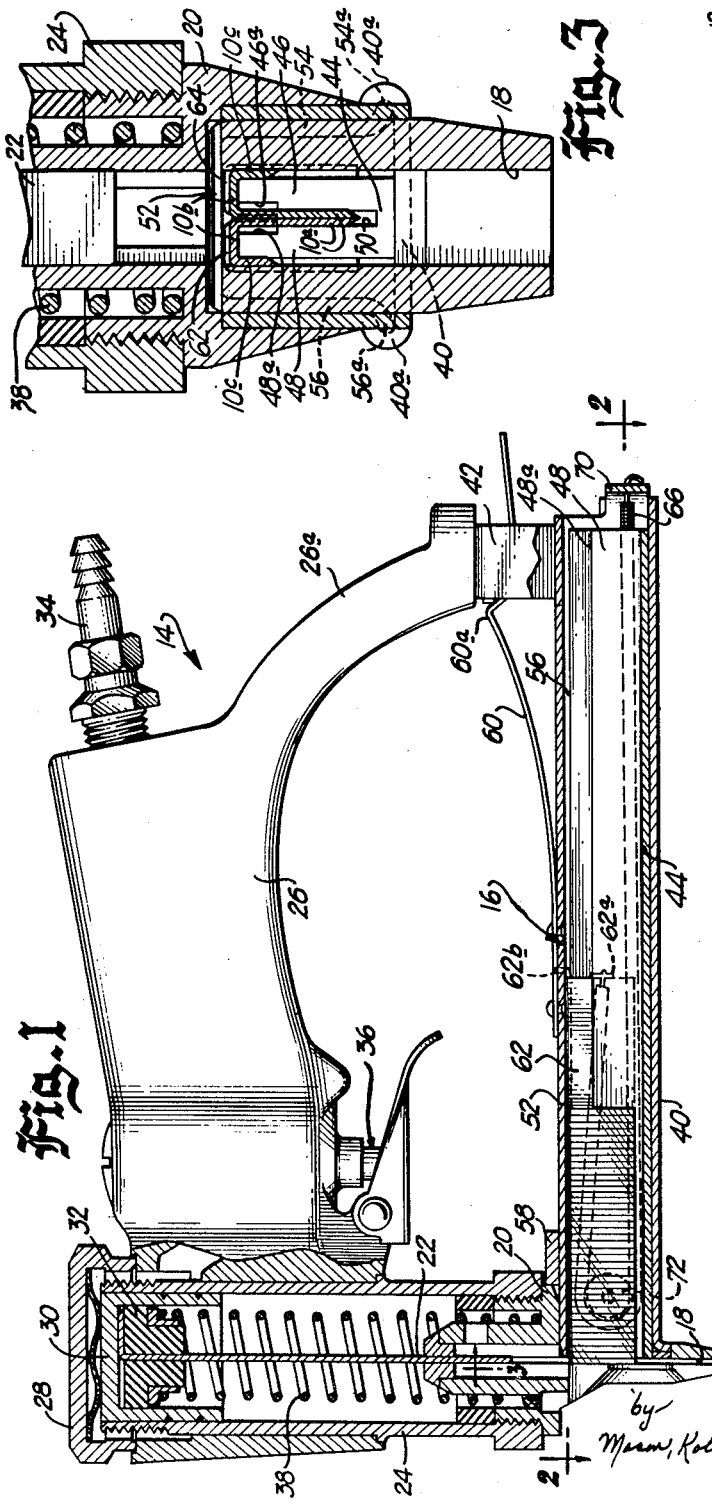
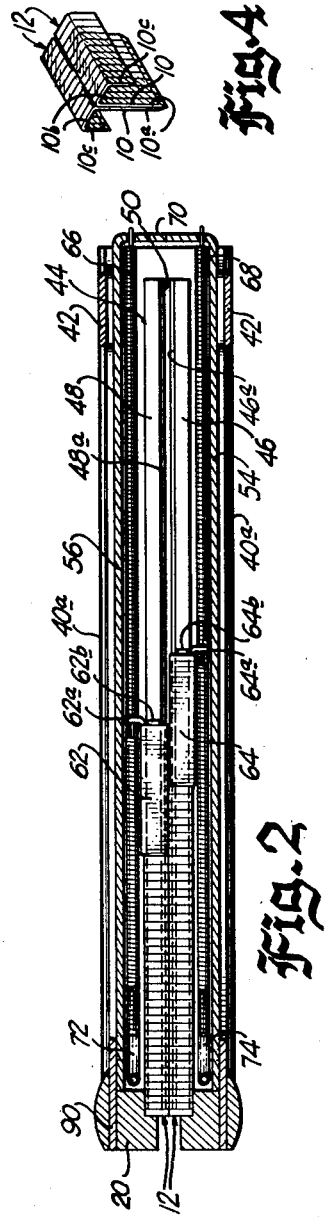
INVENTOR
OSCAR A. WANDEL
ATTORNEYS

# United States Patent Office 2,909,780
Patented Oct. 27, 1959

2,909,780
MAGAZINE CONSTRUCTION

Oscar A. Wandel, Mundelein, Ill., assignor to Fastener Corporation, Chicago, Ill., a corporation of Illinois Application June 4, 1957, Serial No. 663,428

1 Claim. (Cl. 1—49)

The present invention relates to a magazine construction and, more particularly, to a magazine including means for simultaneously advancing a plurality of fasteners towards a drive track.

Existing pneumatically operated staple driving equipment affords easily manipulated means for driving fasteners into varying types of workpieces at high speeds. Although the existing apparatus, which generally uses fasteners in the form of staples which are driven into workpieces without clinching, is capable of providing satisfactory means for securing materials together, there remain a number of fastening operations in which headed fasteners, such as nails, are preferred. Attempts have been made to provide pneumatically operated driving apparatus using strips or "sticks" of detachably joined and headed fasteners, but these prior arrangements suffer from a number of deficiencies. A first of these arises from the fact that headed fasteners, due to the necessity of forming an enlarged head on a somewhat smaller shank portion, are expensive to fabricate and do not readily lend themselves to be formed on high speed equipment such as that used to form staples from wire stock. Another deficiency or problem is that of detachably joining the headed fasteners into strips or "sticks" from which they are sequentially severed during the driving operation. This is easily accomplished with staples by the use of fully automatic machinery, but it is extremely difficult to provide similar equipment for handling fasteners with enlarged head portions, particularly where the head portions are such as can be formed by automatic equipment.

Accordingly, one object of the present invention is to provide a new and improved magazine construction including means for conjointly feeding a pair of separate fasteners into a drive track so that this pair of fasteners can be driven to provide a fastener resembling a nail.

Another object is to provide a magazine having strips of fasteners with elongated legs in which the magazine includes means for holding the elongated legs in abutting relationship while feeding such fasteners to a drive track.

A further object is to provide a magazine construction including two separate and independent strip follower means for feeding pairs of fasteners into a driving means therefor.

In accordance with these and many other objects a pair of separate fasteners having elongated legs are fed into a drive track of a conventional pneumatically operated tacker or nailer with the elongated legs in an abutting relationship, thereby forming the shank of the nail. The driver blade of the fastener driving apparatus simultaneously engages the head portions of the abutting fasteners so as simultaneously to drive them into a workpiece, the elongated legs of the fastener being maintained in the abutting relationship during the driving operation. To accomplish the concurrent feeding of a pair of separate fasteners into the drive track, the present invention includes a new and improved magazine construction having a pair of transversely spaced supporting elements which individually support two strips of fasteners with the elongated legs thereof disposed between the two supports in an abutting relationship with each other. Separate strip follower means movable relative to the magazine housing each engage one of the "sticks" or strips of connected fasteners. Resilient biasing means interconnecting the housing and the followers concurrently bias the two strips toward the drive track so that two separate fasteners are fed into the drive track with the elongated legs thereof in an abutting relationship following each operation of the fastener driving apparatus.

Many other objects and advantages of the present invention will become apparent from a consideration of the following detailed description thereof when considered in conjunction with the following drawings in which:

Fig. 1 is a side elevational view in partial section of a pneumatically operated fastener driving apparatus capable of performing the novel fastener driving method of the present invention and including a new and improved magazine construction;

Fig. 2 is a sectional view taken along line 2—2 of Fig. 1, assuming that the complete magazine construction is illustrated therein;

Fig. 3 is an enlarged fragmentary cross-sectional view taken along 3—3 in Fig. 1 again assuming that Fig. 1 shows the complete construction; and Fig. 4 is a perspective view showing a plurality of fasteners used in the method and apparatus of the present invention when formed into strips and disposed in an abutting relationship.

As indicated above, the ease and speed of driving fasteners, such as unclinched staples or tacks, by the use of pneumaticaly operated fastener driving apparatus has led to the use of this type of equipment over a wide range of fabricating operations. However, in certain industries, there has been a marked reluctance to adopt pneumatically operated tacking or stapling equipment because of the belief that headed fasteners are required to provide adequate securing of certain elements. In an attempt to provide headed fasteners for use in pneumatically operated hand and bench tools, it has been proposed to provide fasteners or tacks comprising a unitary elongated shank and a transverse head portion welded or otherwise secured to the shank portion, the individual fasteners thereafter being detachably joined in a strip or "stick" for use in a magazine or similar fastener feeding mechanism. However, the cost and difficulty of fabricating fasteners of this type has prevented their successful use, particularly in view of the fact that fasteners of this type cannot readily be formed on existing automatic staple making machinery.

This objection is overcome by providing a fastener 10 having an elongated leg portion 10a, a crown portion 10b and a short leg portion 10c, which is capable of being formed by existing automatic staple forming machinery. This equipment is also capable of forming a plurality of individual fasteners 10 into a strip or "stick" 12 of fasteners in which each of the individual fasteners 10 is detachably joined to the adjacent fasteners in the strip. In driving these fasteners, conventional pneumatically operated fastener driving apparatus, such as a pneumatic tool indicated generally as 14, can be used. The strips 12 are placed in a new and improved magazine construction, indicated generally as 16, in the manner shown in Fig. 4 in which the elongated legs 10a of the fasteners 10 in two strips 12 are disposed in an abutting relationship, and the magazine 16 feeds the two strips 12 toward a drive track 18 formed in a nose piece 20 of the tacker 14 so that a pair of the fasteners 10 are simultaneously fed into the drive track 18 with the legs 10a thereof held in abutting relationship as best shown in Fig. 4 of the drawings.

When the pneumatic tacker 14 is actuated, a driving means, such as a driver blade 22 movable in the drive track 18, simultaneously engages the crown portions 10b of both of the fasteners 10 then disposed in the drive track 18 and moves these two fasteners downwardly through this drive track to concurrently drive them into a workpiece. During this downward movement, the drive track 18 maintains the legs 10a in an abutting relationship so that, when the pair of fasteners 10 are driven into the workpiece, the abutting elongated legs 10a of the two fasteners 10 form the shank of the nail and the crown portions 10b of the two fasteners comprise the head of the nail. The penetration of the workpiece by the short legs 10c serves to hold the legs 10a in an abutting relationship when driven into the wood and also provides an additional adherence for securing the fasteners 10 to the workpiece. In this manner, by concurrently feeding a pair of separate fasteners 10 into the drive track 18 with the legs 10a thereof in abutting relationship and by simultaneously engaging and driving the two fasteners 10 while maintaining the legs 10a in an abutting relationship, a fastener simulating a nail is provided which is capable of being quickly and economically fabricated by existing automatic staple making machinery and which is capable of being driven by existing pneumatic fastener driving tools, when provided with the new and improved magazine construction 16 of the present invention.

Referring now more specifically to the pneumatically operated hand tool or tacker 14, this construction may comprise any one of the many types well known in the art, such as the "Duo-Fast" direct drive air tacker manufactured and sold by the Fastener Corporation of Chicago, Illinois, and identified as catalog numbers DW-308 and DN-348, among others. The hand tool 14 may also comprise a pneumatically operated fastener driving apparatus of the type disclosed in the copending application of Oscar A. Wandel, Serial No. 527,697, filed August 11, 1955, which copending application is assigned to the same assignee as the present application. In these prior pneumatically operated devices, such as the pneumatically operated hand tool 14, there is provided a cylinder 24 secured to a casting or housing 26 which is closed at its upper end by a cover cap 28. A hollow piston 30 slidably mounted within the cylinder 24 receives a supporting member 32 to which an upper end of the driving blade 22 is secured. When compressed air supplied to a hollow handle portion of the casting or housing 26 by an inlet nipple 34 is admitted to the interior of the cylinder 24 under the control of a trigger actuated control valve 36, the piston 30 moves downwardly to advance the fastener driving blade 22 through the drive track 18 formed in the nose piece 20 which is threadedly secured to the cylinder 24. During this downward movement, the end of the driver blade 22 simultaneously engages the crown portions 10b of the two fasteners 10 in the drive track 18 and drives them out of the track 18 into the workpiece. When the trigger controlled valve 36 is released, a coiled compression spring 38 interposed between the blade support 32 and the nose piece 20 resiliently returns the piston 30 to the normal position illustrated in Fig. 1, thus retracting the driver blade 22 from the drive track 18 so that the magazine assembly 16 supplies another pair of fasteners 10 to the drive track 18.

Referring now to the magazine construction 16, which concurrently feeds two separate fasteners 10 into the drive track 18 for setting by the drive blade 22, this construction includes a base plate 40 secured at one end to the nose piece 20 and at its other end to a depending portion 26a of the casting 26 by a somewhat U-shaped bracket 42. To slidably support two strips 12 of fasteners in a back-to-back relationship, a substantially U-shaped supporting member 44 is secured to an upper wall of the bottom plate 40 and is provided with a pair of transversely spaced and upstanding leg portions 46 and 48 (Fig. 3) defining a slot 50 therebetween. The two strips 12 of fasteners are mounted on the upstanding or projecting legs or leg portions 46 and 48 with the crown portions 10b engaging the upper surfaces of the legs 46 and 48 and with the elongated legs 10a in an abutting relationship and disposed within the slot 50 as best shown in Fig. 3 of the drawings. The outer legs 10c of the fasteners 10 forming the two strips 12 engage the outer surfaces of the legs 46 and 48 to aid in locating the strips 12 on the supporting member 44.

To provide a housing for the magazine assembly 16, a substantially U-shaped cover member 52 is provided having a pair of side walls 54 and 56 with outwardly turned end portions 54a and 56a slidably received within a pair of opposed grooves formed by curved and inwardly turned edges 40a of the base plate 40. The height of the cover plate 52 is such that the upper wall thereof overlies the upper surface of the crown portions 10b of the fastener strips 12, and this upper or bight portion of the cover plate 52 also supports a stop member 58 which bears against the nose piece 20 to limit inward movement of the cover 52 toward the drive track 18 formed in the nose piece 20. To provide a latch for securing the removable cover plate 52 in the position illustrated in Fig. 1, a flat spring detent member 60 is provided having one end secured to the upper wall of the cover plate 52 and an offset end portion 60a which cooperates with suitable latch means carried on the U-shaped supporting bracket 42.

To provide a means for advancing the staple strips 12 toward the drive track 18, a pair of follower elements 62 and 64 are provided. These follower elements are substantially U-shaped in configuration and are slidably mounted on the upper end of the supporting legs 46 and 48 of the fastener support 44. The inner walls of the supports 46 and 48 are provided with grooved or cutaway portions 48a and 46a to slidably receive the inner depending leg of each of the U-shaped follower elements 62 and 64, thus to permit the metal used in forming the follower elements 62 and 64 to have a greater thickness than the thickness of the material used in forming the fastener elements 10.

To provide a means for resiliently biasing the follower elements 62 and 64 toward the drive track 18, the magazine assembly 16 includes a pair of tension springs 66 and 68. One end of each of these springs is connected to a bridging portion 70 connecting the side walls 54 and 56 of the cover plate 52, and the other ends of each of these springs are connected to projecting lugs 62a and 64a formed integral with the outer legs of the followers 62 and 64. The intermediate portions of the springs 66 and 68 pass around a pair of pulleys 72 and 74 which are rotatably mounted on an inner surface of the side walls 56 and 54 of the cover 52, respectively. Accordingly, the springs 66 and 68 resiliently and independently urge the two followers 62 and 64 to the left, as shown in Fig. 2 of the drawings, to force the two strips 12 of fasteners 10 toward the drive track 18 in the nose piece 20.

To provide a means for retracting the followers 62 and 64 and to limit movement thereof toward the drive track 18, each of these followers is provided with an upstanding lub 62b and 64b, respectively, which projects upwardly through suitably formed slots (not shown) in the upper wall of the cover 52. Therefore, when the cover 52 is moved to the right, as viewed in Figs. 1 and 2, the upstanding lugs 62b and 64b engage the ends of the slots in the upper wall of the cover plate 52 and are moved to the right with the cover. This facilitates the insertion of replacement strips 12 into the magazine assembly 16 by insuring that the follower elements 62 and 64 are retracted whenever the cover 52 is displaced from the position shown in the drawing.

In operation, the latch member 60 is released and the cover 52 is moved to the right (Figs. 1 and 2) so that the follower elements 62 and 64 are displaced to the right end of the support 44. Thereafter, two strips 12 are placed on the supporting member 54 with the elongated legs 10a of the fasteners 10 forming each of the strips 12 in an abutting relationship within the groove or slot 50. Thereafter, the cover 52 is moved to the left (Figs. 1 and 2) so that the leading edges of the follower elements 62 and 64 engage the last fasteners 10 in the strips 12 and resiliently bias the leading edges of these strips toward the drive track 18 so that the first fastener 10 in each of the strips 12 is disposed within the drive track 18 beneath the end of the driving blade 22.

The nose piece 20 is then positioned adjacent the workpiece, and the control valve 36 is operated to admit compressed air into the upper end of the cylinder 24, thereby causing downward movement of the piston 30 and the connected driver blade 22. During this downward movement, the lower end of the driving blade 22 simultaneously engages the crown portions 10b of the pair of fasteners in the drive track 18 and initiates downward movement of these two fasteners 10 during which the elongated legs 10a thereof are maintained in an abutting relationship and the outer legs 10c thereof are in sliding engagement with the walls of the nose piece 20 defining the drive track 18. Continuing downward movement of the blade 22 drives the elongated legs 10a of the fasteners 10 into the workpiece, following which the shorter outer legs 10c also engage and are driven into the workpiece. The depth to which the fasteners 10 can be driven is limited by the engagement of the lower surface of the crown members 10b with the upper surface of the workpiece or the material to be fastened. In this manner, the pair of separate fasteners 10 are driven into the workpiece to provide a composite fastener effectively defining a headed fastener or nail.

When the control valve 36 is released, the return spring 38 restores the piston 30 and the driver blade 22 to the normal position illustrated in Fig. 1 so that, when the end of the driving blade 22 moves out of alignment with the magazine assembly 16, the springs 66 and 68 biasing the followers 62 and 64 toward the drive track 18 cause the next two fasteners 10 in the two strips 12 to be fed into the drive track 18 in a position to be engaged and driven by the blade 22.

In summary, therefore, the present invention provides a new and improved magazine assembly 16 for concurrently feeding a pair of separate fasteners into the drive track 18 in an abutting relation. When the hand tool 14 is operated, the blade 22 thereof concurrently engages the crown portions 10b of the pair of fasteners 10 in the drive track 18 and moves these two fasteners downwardly through the drive track while maintaining the elongated legs 10a thereof in engagement so that these two legs are concurrently driven into the workpiece and maintained in their abutting relationship therein. By maintaining the two legs 10a of the fasteners 10 in an abutting relationship with the crown portions 10b extending outwardly at right angles to the legs 10a, a composite fastener simulating a nail is provided. These fasteners are easily formed by existing automatic staple making machinery and are capable of being driven by existing types of hand tools when provided with magazines like the magazine assembly 16 of the present invention.

Although the present invention has been described by reference to only a single embodiment thereof, it will be apparent that numerous other modifications and embodiments may be devised by those skilled in the art which will fall within the spirit and scope of the present invention.

What is claimed and desired to be secured by Letters Patent of the United States is:

A magazine for supporting a plurality of L-shaped fasteners in back-to-back relationship and for selectively feeding pairs of said fasteners through an opening to a fastener drive track, said magazine comprising an elongated base plate secured to said drive track below said opening and extending outwardly away from said drive track, a fastener support mounted on said base plate in alignment with said opening, said fastener support including a central groove, said support being adapted to slidably support a pair of strips of said fasteners with the juxtaposed back legs of the fasteners on adjacent strips being received in said groove and the shorter legs depending along the outer sides of said fastener support, a pair of elongated, U-shaped followers slidably mounted on said support in side-by-side relationship with the adjacent legs thereof juxtaposed and depending into said groove and the other legs respectively depending along the outer sides of said fastener support, said groove having an enlarged upper end to accommodate the legs of said followers, a U-shaped cover slidably mounted on said base plate and enclosing said elements and said follower means, a pair of tension springs respectively disposed between the outer sides of said supporting element and the side walls of said cover, and means respectively connecting said springs between the outer edges of said follower means and the end of said cover remote from said opening so that said springs independently advance the strips on said supporting elements toward said opening to concurrently advance fasteners from both of said strips into said drive track.

References Cited in the file of this patent

UNITED STATES PATENTS

| | | |
|---|---|---|
| 2,056,355 | Lang | Oct. 6, 1936 |
| 2,149,124 | Roy | Feb. 28, 1939 |
| 2,716,749 | Timmerbeil | Sept. 6, 1955 |